US007868813B2

(12) United States Patent
O'Flynn et al.

(10) Patent No.: US 7,868,813 B2
(45) Date of Patent: Jan. 11, 2011

(54) MULTI-USE BEARING AND RANGE LINE

(75) Inventors: Mark James O'Flynn, Balwyn North (AU); Lillian Chang, Sprindvale (AU); Virginie Bernard Blond, Altona (AU)

(73) Assignee: Thales Australia Limited (AU)

( * ) Notice: Subject to any disclaimer, the term of this patent is extended or adjusted under 35 U.S.C. 154(b) by 152 days.

(21) Appl. No.: 12/381,011

(22) Filed: Mar. 5, 2009

(65) Prior Publication Data
US 2010/0117887 A1 May 13, 2010

(30) Foreign Application Priority Data
Nov. 7, 2008 (AU) .............................. 2008905775

(51) Int. Cl.
*G01S 13/93* (2006.01)
*G01S 7/22* (2006.01)
(52) U.S. Cl. ........................... 342/36; 342/38; 342/176; 342/179; 342/182; 342/183
(58) Field of Classification Search ............. 342/36–40, 342/176, 179, 181–183, 195
See application file for complete search history.

(56) References Cited
U.S. PATENT DOCUMENTS

| 3,652,836 | A | * | 3/1972 | Richardson et al. ......... 701/203 |
| 4,071,843 | A | * | 1/1978 | Marien ........................ 342/55 |
| 4,692,869 | A | * | 9/1987 | King et al. .................. 701/206 |
| 5,111,400 | A | * | 5/1992 | Yoder ............................ 701/3 |
| 5,179,377 | A | * | 1/1993 | Hancock ..................... 340/961 |
| 2010/0117887 | A1 * | | 5/2010 | O'Flynn et al. ............... 342/36 |
| 2010/0141481 | A1 * | | 6/2010 | O'Flynn ..................... 340/970 |
| 2010/0153875 | A1 * | | 6/2010 | O'Flynn et al. ............. 715/786 |

* cited by examiner

*Primary Examiner*—John B Sotomayor
(74) *Attorney, Agent, or Firm*—Wood, Phillips, Katz, Clark & Mortimer

(57) ABSTRACT

A method (400), a system and a computer program product are disclosed for graphically displaying air traffic control information in an air traffic control system. Information about objects in an air traffic control environment is compiled and calculated (410). Tokens (e.g., text, icons, images, or other symbols) corresponding to the objects in the air traffic control environment are displayed (420). At least two objects are selectively designated (430) in combination as a source object and a target object connected by a bearing and range line token (210, 220, 230, 240). Air traffic control information (212, 222, 232, 242) about the combination of objects associated with the bearing and range line token dependent upon the combination of objects designated in the combination is displayed (440). The displayed air traffic control information is required decision making information to enable an air traffic controller to manage air traffic. Display of the air traffic management information is dynamically updated (450) upon any change of the designated objects.

21 Claims, 5 Drawing Sheets

MULTI-USE BEARING AND RANGE LINE

TECHNICAL FIELD

The present invention relates generally to air traffic control systems and more particularly to display systems for air traffic control.

BACKGROUND

Air Traffic Control (ATC) aims to provide a safe, orderly and expeditious flow of air traffic. This is achieved by ensuring separation of aircraft from other aircraft and terrain whilst the aircraft travel from respective departure points to destination points, with as little restriction or external impact as possible. An efficient air traffic control system is one in which aircraft flow is restricted only by airspace capacity and not by limitations of the system.

There are two principal methods that have been employed to provide protection from the hazard of collisions between aircraft. The first method is based on the concept that when aircraft are being flown in weather conditions where pilots can see and be seen, the individual pilot is responsible directly for avoiding collisions with other aircraft. This follows the same connotation that each automobile driver looks out for other traffic. The other principle method relies on the ground-based ATC service, which is designed to provide separation between aircraft operating in accordance with instrument flight rules, primarily when weather conditions do not allow the pilot to see and be seen. The ATC service provides instructions and information to the pilot of an aircraft about altitudes and flight paths to be followed.

At the heart of the ATC system is an air traffic controller who accesses and assesses information from a variety of sources. The information provided enables the air traffic controller to make decisions, develop plans, communicate intentions and issue instructions that ensure the aircraft operate as intended in a safe, orderly and expeditious manner. The workload of the air traffic controller can be heavy at times. To maintain a controller's workload at a safe and acceptable level, the airspace is divided into areas called sectors. Each sector is a defined geographical area that is made up of a number of airways or routes, airports, and navigation aids. Each sector is assigned a certain number of air traffic controllers and assistants, who are responsible for all aircraft in their designated sector. During periods of low traffic density, provisions are made to combine sectors.

Supporting the air traffic controller in this task is an increasing array of automation, communications and surveillance equipment, such as computer processing, radio, and radar. The air traffic controller receives, assesses, and responds to a continuous flow of visual and auditory cues related to the aircraft under their control, from the various support systems available to the air traffic controller. The responses to the various cues results in a steady stream of instructions to aircraft and coordination with other sectors that enables the safe progress of air traffic.

Air Traffic Control is a highly conceptual and "real time" information based environment that places a complex set of cognitive demands on the air traffic controller. These controllers rely heavily on visual and auditory cues to maintain situational awareness of the traffic under their control and to help prioritise the many actions to be completed.

The decisions and actions that form the fundamental core of air traffic control are entirely dependent on an accurate and timely assessment of information from a range of sources. To assist the controller in accessing and assessing relevant information a range of tools have been developed over time. These tools are individual and specific in nature. The tools address a specific information source or requirement and are each individually selected and activated by the air traffic controller. The activation process for each tool is unique and may require a range of human-machine interface inputs (e.g., keyboard, pointer device such as a mouse, screen, and the like).

The process for accessing and assessing a specific piece of information therefore requires the air traffic controller to fustly determine the information required to make a particular decision, secondly determine the appropriate tool(s) to provide the required information, thirdly select and activate the relevant tool(s) to obtain the information, and finally When finished deactivate and close the tool(s) concerned.

Disadvantageously, in the midst of a busy traffic sequence, the activation processes for a number of tools can be both time consuming, cumbersome, and distracting from the primary task of traffic separation and management This adversely impacts the air traffic controller ability to focus more time and mental resources on core tasks of the air traffic controller. Therefore, a need exists for an integrated tool that is quick, simple, and intuitive process, so that the time available for consideration of traffic management options is maximised.

SUMMARY

In accordance with an aspect of the invention, there is provided a method of graphically displaying air traffic control information in an air traffic control system, the air traffic comprising a processor, at least one memory device, a display device, at least one human interface, and at least one network interface to external information sources. The method comprises the steps of: compiling and calculating information about objects in an air traffic control environment; displaying a plurality of tokens corresponding to the objects in the air traffic control environment; selectively designating at least two objects in combination as a source object and a target object connected by a bearing and range line token; displaying air traffic control information about the combination of objects associated with the bearing and range line token dependent upon the combination of objects designated in the combination; and dynamically updating display of the air traffic management information upon any change of the designated objects.

The change of the designated objects includes a change in position, a change in speed, a change in altitude, a change of heading, or a combination thereof, of at least one of the source object and the target object.

The displayed air traffic control information is required decision making information to enable an air traffic controller to manage air traffic.

The combination of source and target objects may be a geographic location and another geographic location, an aircraft and a geographic location, an aircraft and another aircraft, or an aircraft and a point on route.

For the combination of a geographic location as source object and another geographic location as target object, the information that is displayed in association with the bearing and range line may comprise: positions, bearing, and distance.

For the combination of a geographic location as source object and an aircraft as target object, the information that is displayed in association with the bearing and range line may comprise: positions, bearing, distance, time interval to reach, and estimated time over.

For the combination of an aircraft as source object and a geographic location as target object the information that is displayed in association with the bearing and range line comprises: positions, bearing, distance, time interval to reach, and estimated time over.

For the combination of an aircraft as source object and another aircraft as target object, the information that is displayed in association with the bearing and range line may comprise: positions, bearing, distance, link indicator, closest point of approach, minimum separation (between aircraft), crossing angle, and lateral conflict region.

For the combination of an aircraft as source object and a point on route as target object, the information that is displayed in association with the bearing and range line may comprise: positions, time to point along the route, distances to point along the route, direct time to point, direct distances to point, hold at point, direct reroute, and update position at point.

The step of selectively designating objects may comprise clicking on or selecting each token in a combination using at least one human interface device connected to the air traffic control system.

In accordance with further aspects of the invention, there is provided an air traffic control system for graphically displaying air traffic control information and a computer program product for graphically displaying air traffic control information in the air traffic control system.

BRIEF DESCRIPTION OF THE DRAWINGS

The embodiments of the invention are described hereinafter with reference to the drawings, in which.

DETAILED DESCRIPTION

Figure 1:
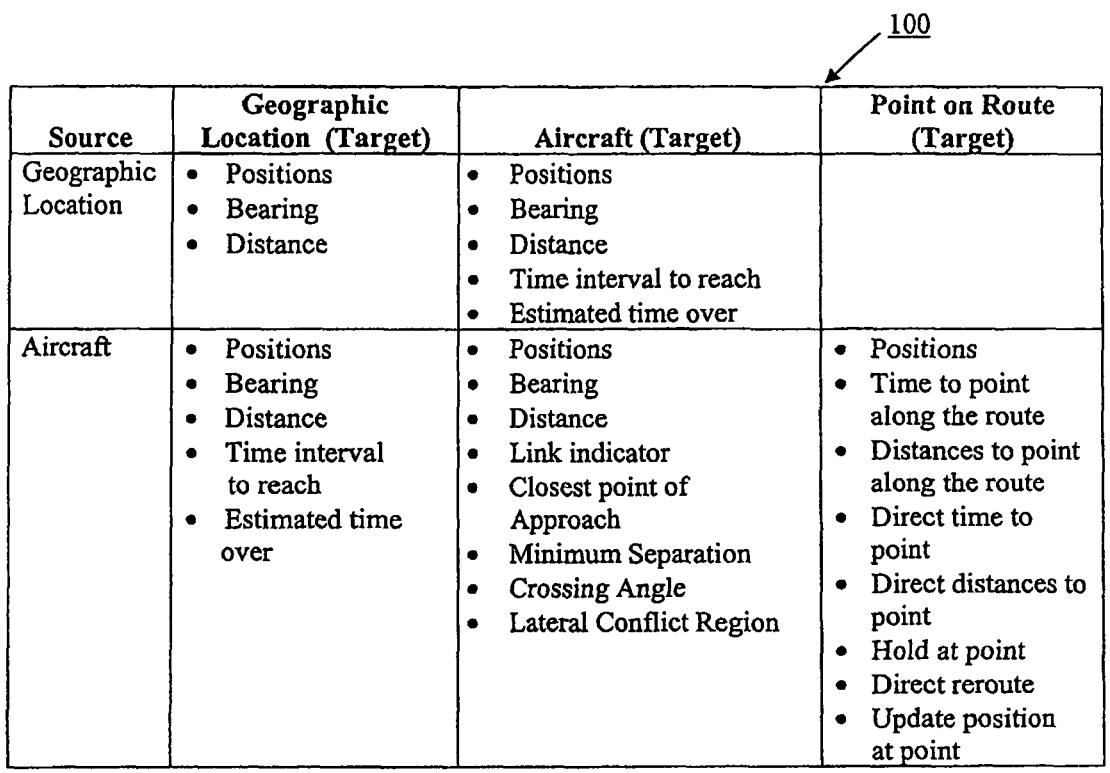
FIG. 1 illustrates a table of information the Bearing and Range Line (BRL) provides dependent upon the combination of source and target objects.

Methods, systems and computer program products are disclosed for graphically displaying air traffic control information in an air traffic control system. In the following description, numerous specific details are set forth. However, from this disclosure, it will be apparent to those skilled in the art that modifications and/or substitutions may be made without departing from the scope and spirit of the invention. In other circumstances, specific details may be omitted so as not to obscure the invention.

To enable the air traffic controller to focus more time and mental resources on core tasks, a need exists for an integrated tool that makes the activation and display of multiple pieces of pertinent information a single, quick, simple and intuitive process. Such a solution allows the air traffic controller instant, uninhibited access to the required decision making information thereby maximising time available for consideration of traffic management options.

The Multi-Use Bearing and Range Line (BRL) is a single tool that provides the operator with all the information required to quickly comprehend and understand the relationship between a combination of aircraft and/or geographical locations. The BRL, in its basic form, is used to provide distance and azimuth between two targets, which may be:

Geographic location to geographic location,
Aircraft to geographic location,
Aircraft to aircraft, and
Aircraft to its planned route.

The Multi-Use BRL proposed provides more than the traditional range and azimuth by including additional information, which may include estimates, positions, time, crossing angle, etc. This information permits the air traffic controllers to apply different techniques (multi-use) to execute their duties.

At BRL activation, the source object is either an aircraft or a geographic point, and the target can be a geographic point, another aircraft or the source aircraft's route.

Where reference is made in any one or more of the accompanying drawings to steps and/or features, which have the same reference numerals, those steps and/or features have, for the purposes of this description, the same function(s) or operation(s), unless the contrary intention appears.

Before describing the embodiments of the invention in detail, by way of introduction, a general purpose computer is described to provide context for implementing the invention. The embodiments of the invention described hereinafter with reference to FIGS. 1-4 may be implemented using a computer system 500, such as that shown in FIG. 5, in which the processes of FIGS. 1 to 4 may be implemented as software, such as one or more application programs executable within the computer system 500. The computer system 500 may be provided with radar data, flight plans, and information from other sources as is well known in the air traffic control industry. In particular, the steps of the method shown in FIG. 4 are effected by instructions in the software that are carried out within the computer system 500. The instructions may be formed as one or more computer program code modules, each for performing one or more particular tasks. The software may also be divided into two separate parts, in which a first part and the corresponding code modules perform the methods for rendering a display list to an output image and the corresponding code modules manage a user interface between the first part and the user. The software may be stored in a computer readable medium, including the storage devices described hereinafter, for example. The software is loaded into the computer system 500 from the computer readable medium and then executed by the computer system 500. A computer readable medium having such software or computer program recorded on the computer readable medium is a computer program product. The use of the computer program product in the computer system 500 preferably effects an advantageous apparatus for graphically displaying air traffic control information in an air traffic control system.

Figure 5:
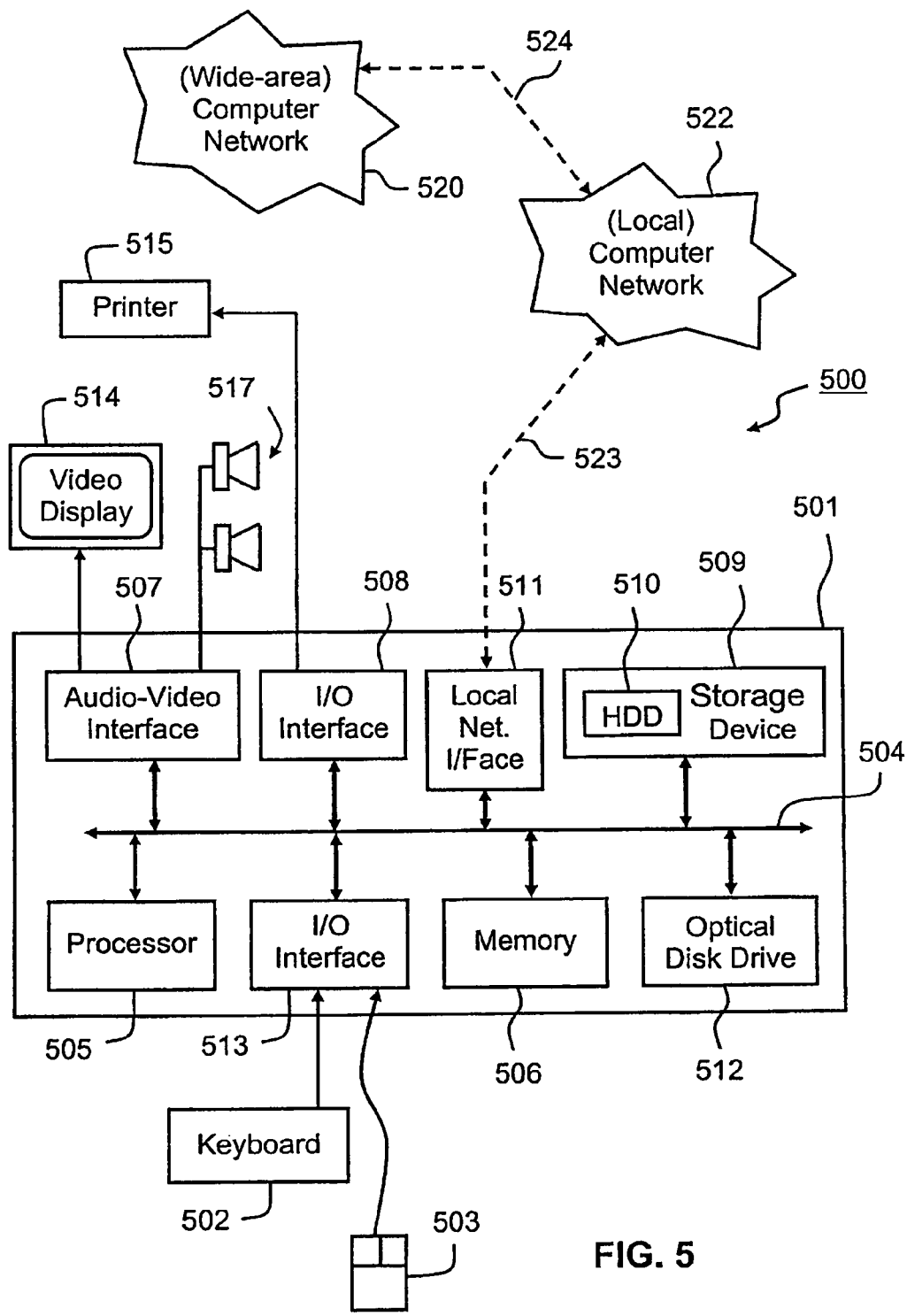
FIG. 5 is a block diagram of a general-purpose computer with which embodiments of the invention may be practiced.

As shown in FIG. 5, the computer system 500 is formed by a computer module 501, input devices such as a keyboard 502 and a mouse pointer device and/or other human machine interface device 503, and output devices including a printer 515, a display device 514 and loudspeakers 517. The display device 514 may be a cathode ray tube type device, an LCD monitor or other suitable device for graphically displaying air traffic control information. A Local Network Interface device 511 may be used by the computer module 501 for communicating to and from a local computer network 522 via a connection 523, to a wide-area network (WAN) 520, such as a private WAN, via a connection 524.

The computer module 501 typically includes at least one processor unit 505, and a memory unit 506 for example formed from semiconductor random access memory (RAM) and read only memory (ROM) or flash memory. The module 501 also includes a number of input/output (I/O) interfaces including an audio-video interface 507 that couples to the video display 514 and loudspeakers 517, an I/O interface 513 for the keyboard 502 and a pointing device that could be a mouse 503, and an interface 508 for the printer 515. The computer module 501 also has a local network interface 511 which, via a connection 523, permits coupling of the computer system 500 to a local computer network 522, known as a Local Area Network (LAN). As also illustrated, the local network 522 may also couple to the wide network 520 via a connection 524, which would typically include a so-called "firewall" device or similar functionality. The interface 511 may be formed by an Ethernet™ circuit card.

Storage devices 509 are provided and typically include a hard disk drive (HDD) 510. Other devices such as a floppy disk drive, read/write optical drive and a magnetic tape drive (not illustrated) may also be used. An optical disk drive 512 is typically provided to act as a non-volatile source of data. Portable memory devices, such optical disks (e.g., CD-ROM, DVD), USB-RAM, and floppy disks for example may then be used as appropriate sources of data to the system 500.

The components 505 to 513 of the computer module 501 typically communicate via an interconnected bus 504 and in a manner which results in a conventional mode of operation of the computer system 500 known to those skilled in the art. Examples of computers on which the described arrangements can be practised include Personal Computers, workstations, servers or a like computer systems evolved therefrom.

Typically, the application programs discussed hereinbefore are resident on the hard disk drive 510, which are read and controlled in execution by the processor 505. Intermediate storage of such programs and any data fetched from the networks 520 and 522 may be accomplished using the semiconductor memory 506, possibly in concert with the hard disk drive 510. In some instances, the application programs may be supplied to the user encoded on one or more CD-ROM and read via the corresponding drive 512, or alternatively may be read by the user from the networks 520 or 522. Still further, the software can also be loaded into the computer system 500 from other computer readable media Computer readable media refers to any storage medium that participates in providing instructions and/or data to the computer system 500 for execution and/or processing. Examples of such media include floppy disks, magnetic tape, CD-ROM, or a hard disk drive, whether or not such devices are internal or external of the computer module 501.

The second part of the application programs and the corresponding code modules mentioned above may be executed to implement one or more graphical user interfaces (GUIs) to be rendered or otherwise represented upon the display 514. Through manipulation of the keyboard 502 and the mouse 503, a user of the computer system 500 and the application may manipulate the interface to provide controlling commands and/or input to the applications associated with the GUI(s).

The method of FIGS. 1 to 4 may alternatively be implemented in dedicated hardware such as one or more integrated circuits performing the functions or sub functions of graphically displaying air traffic control information in an air traffic control system. Such dedicated hardware may include graphic processors, digital signal processors, or one or more microprocessors and associated memories.

Broadly speaking, with reference to FIG. 4 the embodiments of the invention provide a method 400 for the graphical display of air traffic control information in an air traffic control system. Processing commences in step 405. In step 410, information about objects in an air traffic control environment is compiled and calculated. In step 420, tokens (e.g., text, icons, images, or other symbols) corresponding to the objects in the air traffic control environment are displayed. In step 430, at least two objects are selectively designated in combination as a source object and a target object connected by a bearing and range line token. In step 440, air traffic control information about the combination of objects associated with the bearing and range line token dependent upon the combination of objects designated in the combination is displayed. The displayed air traffic control information is required decision making information to enable an air traffic controller to manage air traffic. The selective designation can be carried out by clicking on or selecting each token in a combination using an input device for human machine interaction for the air traffic control system. In step 450, the display of air traffic management information is dynamically updated upon any change or modification of the designated objects. The change of the designated objects may be due to a change in position, a change in speed, a change in altitude, a change of heading, or a combination thereof, of the source object and/or the target object. In operation, steps 410 to 450 may be continuously carried out in an air traffic control system. Processing terminates in step 460. These and other details are described in greater detail hereinafter.

When activated the BRL displays significant data relevant to the combination selected, as well as providing access to derived information applicable to that relationship. FIG. 1 illustrates a table 100 summarising the information and interactions available between source and target objects. Table I lists source objects in the left column and the headings list target objects. If the source and target objects are both geographic locations, the BRL provides the following information: positions, bearing, and distance. If the source object is a geographic location and the target object is an aircraft, the BRL provides the following information: positions, bearing, distance, time interval to reach (geographic location), and estimated time over (geographic location). If the source object is a geographic location and the target object is a point on route, the BRL does not provide any information for this combination. If the source object is an aircraft and the target object is a geographic location, the BRL provides the following information: positions, bearing, distance, time interval to reach (geographic location), and estimated time over (geographic location). If the source and target objects are both aircraft, the BRL provides the following information: positions, bearing, distance, link indicator, closest point of approach, minimum separation (between aircraft), crossing angle, and lateral conflict region. If the source object is an aircraft and the target object is a point on route, the BRL provides the following information: positions, time to point along the route, distances to point along the route, direct time to point, direct distances to point, hold at point, direct reroute, and update position at point.

In the embodiments of the invention, a single point of display provides all relevant items and interaction options already in the context of the relationship between the source and the target objects. The individual items that are displayed can be varied. To the operator this means no longer selecting multiple tools to gain a complete understanding of the relationship between the source and target objects. Instead, selection of the BRL provides a quick, single point of access to key operational information on the relationship between the source and target objects.

Figure 2:
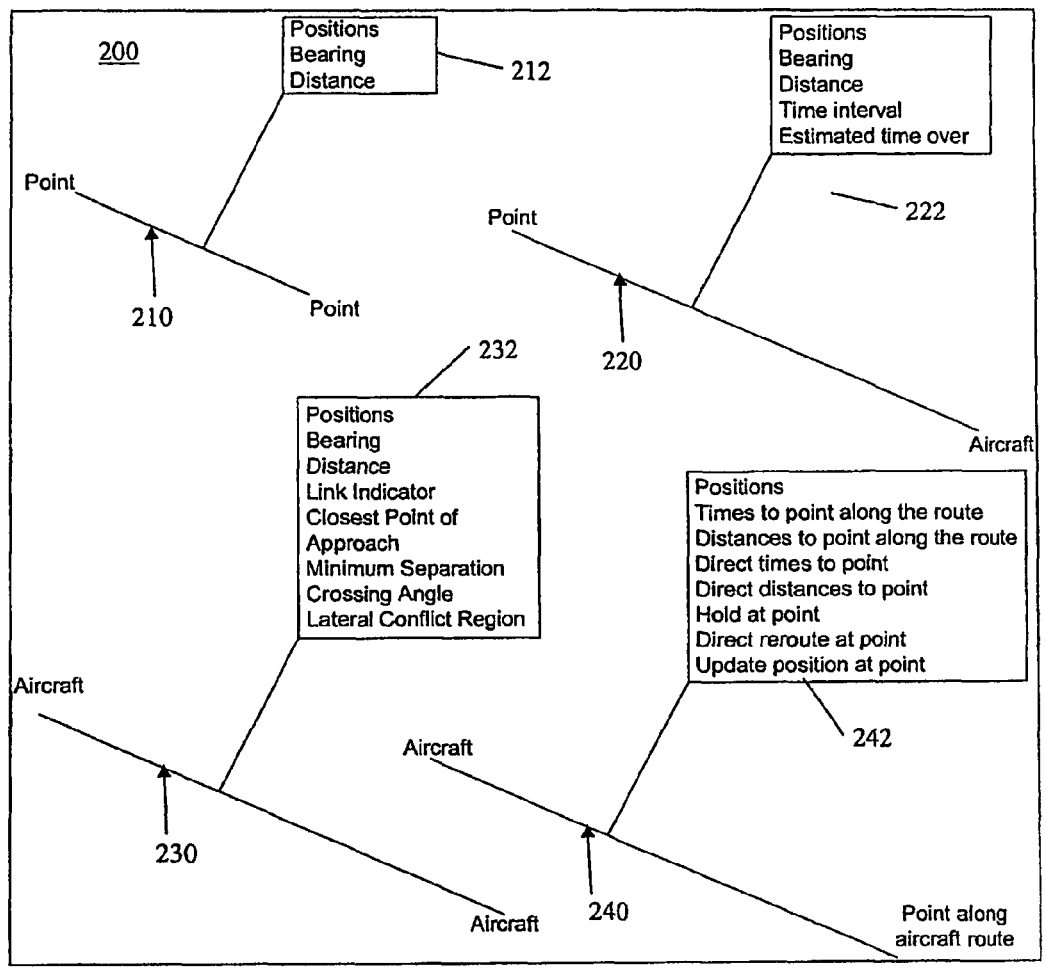
FIG. 2 is a schematic diagram illustrating different BRL display layouts dependent upon the attach point characteristics of the combination of objects.

FIG. 2 shows a display 200 of an ATC system with four different BRL layouts depending on the attach point characteristics. In an instance where the source and target objects are both geographic locations, the BRL 210 is depicted graphically as line extending between the two points. For ease of illustration only, the text "point" is shown as a token to depict the geographic locations, however, other tokens besides text such as icons and other graphical symbols could be used to depict the geographical locations. The BRL 210 provides in a dialog box 212 attached by a line the following information: positions of the targets, bearing, and distance between targets. In another example where the source object is a geographic location and the target object is an aircraft (indicated by a line 220), the BRL 220 provides in a dialog box 222 attached by a line the following information: positions, bearing, distance, time interval to reach (geographic location), and estimated time over (geographic location). The aircraft is indicated by the text "aircraft" but again could be depicted with an icon or other graphical symbol or image instead. In a further example where the source and target objects are both aircraft, the BRL 230 provides in a dialog box 232 attached by a line the following information: positions, bearing, distance, link indicator, closest point of approach, minimum separation (between aircraft), crossing angle, and lateral conflict region. Finally, in the last example where the source object is an aircraft and the target object is a point on route, the BRL 240 provides in a dialog box 242 attached by a line the following information: positions, time to point along the route, distances to point along the route, direct time to point, direct distances to point, hold at point, direct reroute, and update position at point.

Figure 3:
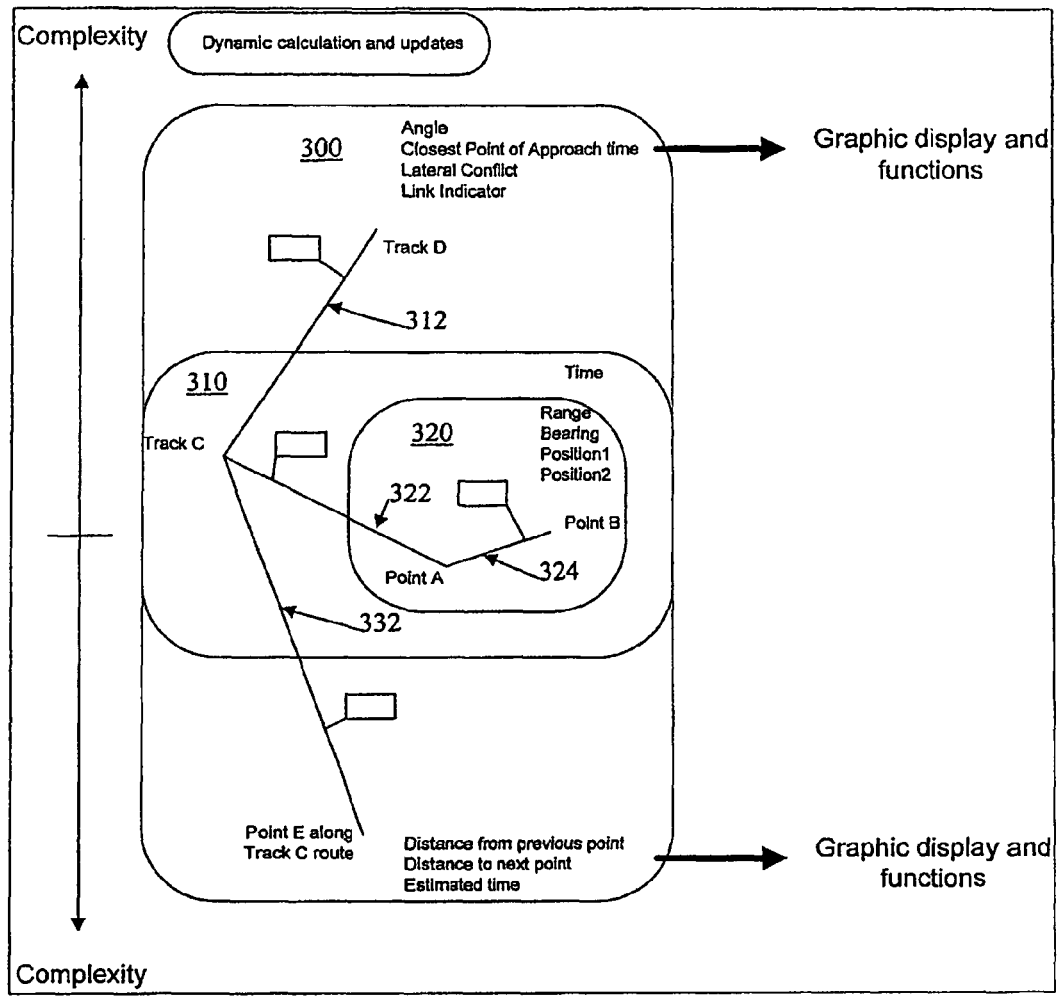
FIG. 3 is a graph illustrating the dynamic calculation of data while creating the BRL and the update of the layout content depending on the characteristics of the attach points.
Figure 4:
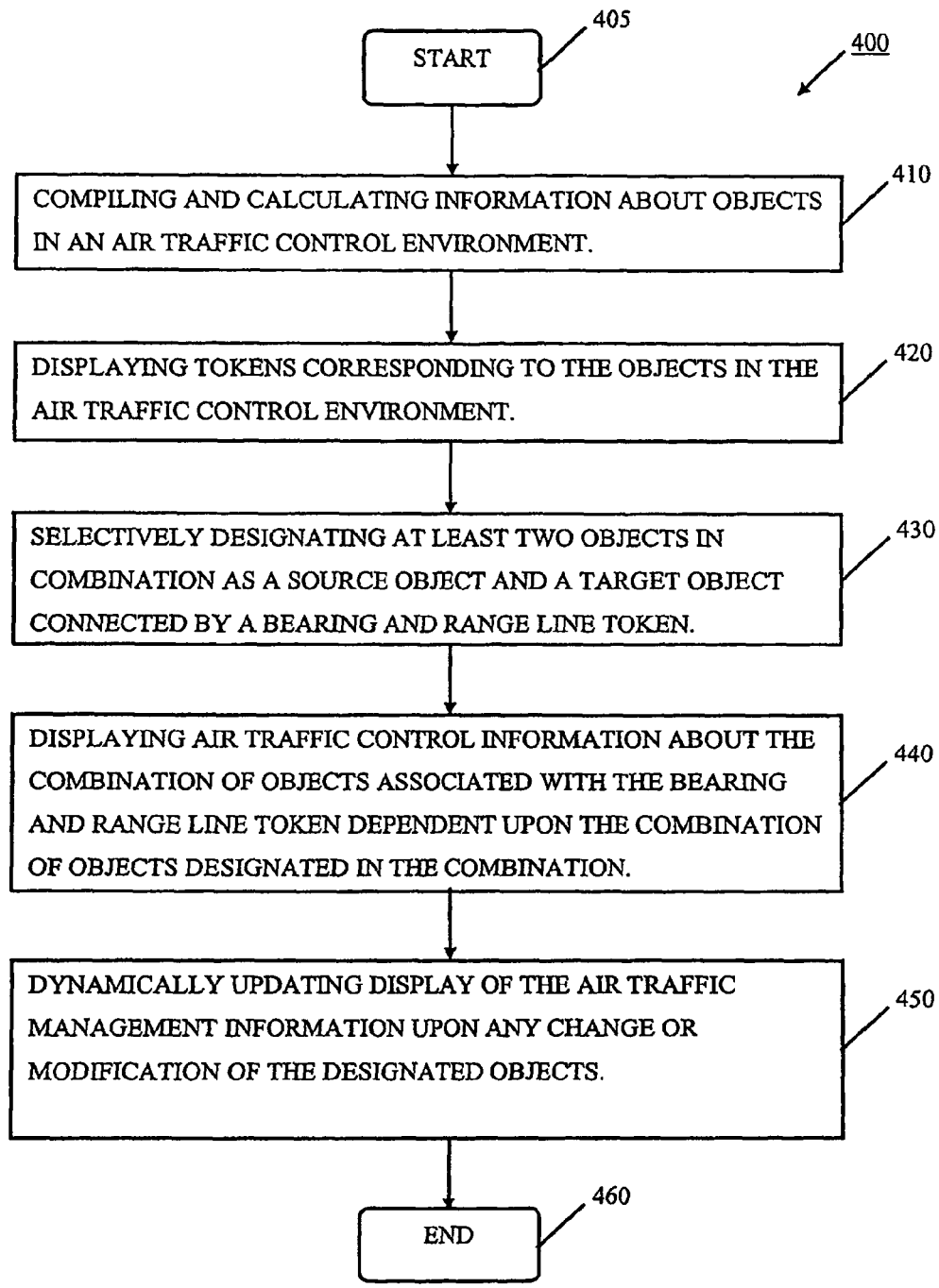
FIG. 4 is a flowchart illustrating a method for graphically displaying air traffic control information in an air traffic control system in accordance with an embodiment of the invention.

FIG. 3 shows the dynamic updating of the BRL layout content depending on the characteristics of the attach points, and the dynamic calculation of data while creating the BRL and when re-attached to different kind of anchor points. A vertical bar on the left of FIG. 3 shows the increasing complexity of calculations and updates from a reference point in the middle, both in downwards and upwards directions. The rectangles with rounded corners 300, 310 and 320 indicate different pairs of linked targets. For each BRL, only two targets are taken into account, e.g., BRL 312 relates to targets "Track D" and "Track C" and BRL 332 relates to targets "Track C" and "Point E along Track C route". Track refers to an aircraft position on the radar display.

The innermost rectangle 320 represents the pair of targets "Point A" and "Point B", the BRL 324, and its dialog box containing the following information: Range, Bearing, Position1 and Position2.

The inner rectangle 310 represents the pair of targets "Point A" and "Track C", the BRL 322, and its dialog box containing the following information: Range, Bearing, Position1 and Position2, already in the innermost rectangle 320, and Time in the rectangle 310.

The rectangle 300 represents the pair of targets "Track D" and "Track C", the BRL 312, and its dialog box containing the following information: Range, Bearing, Position1 and Position2, already in the innermost rectangle 320. The rectangle 300 also represents Time already in the rectangle 310, and Angle, Closest Point, Lateral conflict, and Link Indicator in the rectangle 300.

Tracks C and D refer to two aircraft position (aircraft C and aircraft D) on the radar display.

FIG. 3 explains the different compositions of a dialog box according the level of complexity and the dynamic calculation with a specific combination of targets.

The embodiments of the invention provide a single point of display and interaction for all pertinent operational information in an ATC system on the relationship between source and target objects, as listed in table 100 of FIG. 1. The operator of the ATC system no longer is required to choose between, and activate, multiple tools to investigate and understand key operational aspects of the relationship. Instead, with the activation of a single tool, the ATC controller or operator immediately has before that person the required information to enable rapid comprehension of the operational relationship and to effectively determine the safest and most efficient course of action. By allowing the operator to focus on operational matters, and not the tools, the operator is enabled to devote more time and attention to the primary tasks of traffic separation and management.

The embodiments of the invention are applicable to the air traffic control industries. The foregoing describes only some embodiments of the present invention, and modifications and/or changes can be made thereto without departing from the scope and spirit of the invention, the embodiments being illustrative and not restrictive.

The claims defining the invention are as follows:

1. In an air traffic control system, comprising a processor (505), at least one memory device (506, 509, 510, 512), a display device (514), at least one human interface device (502, 503), and at least one network interface to external information sources (511, 523, 522, 524, 520), a method of graphically displaying air traffic control information in an air traffic control system, said method comprising the steps of:
   compiling and calculating information about objects in an air traffic control environment;
   displaying a plurality of tokens corresponding to said objects in said air traffic control environment;
   selectively designating at least two objects in combination as a source object and a target object connected by a bearing and range line token;
   displaying air traffic control information about said combination of objects associated with said bearing and range line token dependent upon the combination of objects designated in said combination; and
   dynamically updating display of said air traffic management information upon any change of said designated objects.

2. The method according to claim 1, wherein said change of said designated objects comprises a change in position, a change in speed, a change in altitude, a change of heading, or a combination thereof, of at least one of said source object and said target object.

3. The method according to claim 1, wherein said displayed air traffic control information is required decision making information to enable an air traffic controller to manage air traffic.

4. The method according to claim 1, wherein said combination of source and target objects is selected from the group of combinations consisting of a geographic location and another geographic location, an aircraft and a geographic location, an aircraft and an aircraft, and an aircraft and a point on route.

5. The method according to claim 4, wherein for the combination of a geographic location as source object and another geographic location as target object the information that is displayed in association with the bearing and range line comprises: positions, bearing, and distance.

6. The method according to claim 4, wherein for the combination of a geographic location as source object and an aircraft as target object the information that is displayed in association with the bearing and range line comprises: positions, bearing, distance, time interval to reach, and estimated time over.

7. The method according to claim 4, wherein for the combination of an aircraft as source object and a geographic location as target object the information that is displayed in association with the bearing and range line comprises: positions, bearing, distance, time interval to reach, and estimated time over.

8. The method according to claim 4, wherein for the combination of an aircraft as source object and an aircraft as target object the information that is displayed in association with the bearing and range line comprises: positions, bearing, distance, link indicator, closest point of approach, minimum separation (between aircraft), crossing angle, and lateral conflict region.

9. The method according to claim 4, wherein for the combination of an aircraft as source object and a point on route as target object the information that is displayed in association with the bearing and range line comprises: positions, time to point along the route, distances to point along the route, direct time to point, direct distances to point, hold at point, direct reroute, and update position at point.

10. The method according to claim 1, where said selectively designating step comprises clicking on or selecting each token in a combination using said at least one human interface for said air traffic control system.

11. An air traffic control system for graphically displaying air traffic control information, said system comprising:
- a display device (514);
- at least one human interface device (502, 503);
- at least one network interface to external information sources (511, 523, 522, 524, 520);
- at least one memory device (506, 509, 510, 512) for storing computer program instructions;
- a processor (505) coupled to said display device, said at least one human interface device, said at least one network interface, and said at least one memory device, said processor executing instructions to perform the operations of:
  - compiling and calculating information about objects in an air traffic control environment;
  - displaying a plurality of tokens corresponding to said objects in said air traffic control environment;
  - selectively designating at least two objects in combination as a source object and a target object connected by a bearing and range line token;
  - displaying air traffic control information about said combination of objects associated with said bearing and range line token dependent upon the combination of objects designated in said combination; and
  - dynamically updating display of said air traffic management information upon any change of said designated objects.

12. The system according to claim 11, wherein said change of said designated objects comprises a change in position, a change in speed, a change in altitude, a change of heading, or a combination thereof, of at least one of said source object and said target object.

13. The system according to claim 11, wherein said displayed air traffic control information is required decision making information to enable an air traffic controller to manage air traffic.

14. The system according to claim 11, wherein said combination of source and target objects is selected from the group of combinations consisting of a geographic location and another geographic location, an aircraft and a geographic location, an aircraft and an aircraft, and an aircraft and a point on route.

15. The system according to claim 14, wherein for the combination of a geographic location as source object and another geographic location as target object the information that is displayed in association with the bearing and range line comprises: positions, bearing, and distance.

16. The system according to claim 14, wherein for the combination of a geographic location as source object and an aircraft as target object the information that is displayed in association with the bearing and range line comprises: positions, bearing, distance, time interval to reach, and estimated time over.

17. The system according to claim 14, wherein for the combination of an aircraft as source object and a geographic location as target object the information that is displayed in association with the bearing and range line comprises: positions, bearing, distance, time interval to reach, and estimated time over.

18. The system according to claim 14, wherein for the combination of an aircraft as source object and an aircraft as target object the information that is displayed in association with the bearing and range line comprises: positions, bearing, distance, link indicator, closest point of approach, minimum separation (between aircraft), crossing angle, and lateral conflict region.

19. The system according to claim 14, wherein for the combination of an aircraft as source object and a point on route as target object the information that is displayed in association with the bearing and range line comprises: positions, time to point along the route, distances to point along the route, direct time to point, direct distances to point, hold at point, direct reroute, and update position at point.

20. The system according to claim 11, where said selectively designating step comprises clicking on or selecting each token in a combination using said at least one human interface for said air traffic control system.

21. For use in an air traffic control system, comprising a processor (505), memory devices (506, 509, 510, 512), a display device (514), at least one human interface (502, 503), and at least one network interface to external information sources (511, 523, 522, 524, 520), a computer program product comprising a computer readable medium having a computer program recorded therein for graphically displaying air traffic control information in an air traffic control system, said computer program comprising:
- computer program code means for compiling and calculating information about objects in an air traffic control environment;
- computer program code means for displaying a plurality of tokens corresponding to said objects in said air traffic control environment;
- computer program code means for selectively designating at least two objects in combination as a source object and a target object connected by a bearing and range line token;
- computer program code means for displaying air traffic control information about said combination of objects associated with said bearing and range line token dependent upon the combination of objects designated in said combination; and
- computer program code means for dynamically updating display of said air traffic management information upon any change of said designated objects.

* * * * *